United States Patent [19]

Grimm

[11] 4,194,764
[45] Mar. 25, 1980

[54] LOCK COUPLING FOR SAFETY BELTS IN MOTOR VEHICLES

[75] Inventor: Werner Grimm, Rottweil, Fed. Rep. of Germany

[73] Assignee: Jan Jakob Huizinga, Netherlands

[21] Appl. No.: 870,570

[22] Filed: Jan. 18, 1978

[30] Foreign Application Priority Data

Jan. 19, 1977 [DE] Fed. Rep. of Germany ....... 2701978

[51] Int. Cl.² .............................................. B60R 21/10
[52] U.S. Cl. .................................. 280/801; 24/230 A
[58] Field of Search .............. 180/82 C; 280/744, 745, 280/746, 747; 24/230 A

[56] References Cited

U.S. PATENT DOCUMENTS

| | | | |
|---|---|---|---|
| 3,146,846 | 9/1964 | Gutshall | 180/82 C |
| 3,311,188 | 3/1967 | Gutshall | 180/82 C |
| 3,871,090 | 3/1975 | Romanzi, Jr. et al. | 24/230 A |
| 3,963,090 | 6/1976 | Hollins | 180/82 C |

Primary Examiner—Joseph F. Peters, Jr.
Assistant Examiner—Milton L. Smith
Attorney, Agent, or Firm—McGlew and Tuttle

[57] ABSTRACT

A lock coupling for safety belts includes a housing formed with an aperture in the top through which a release button is accessible. The housing has a plug aperture for receiving a coupling part adjustably attached to a safety belt and a coupling pocket having a locking bar is accommodated in the housing and is connected to a tension member secured to a vehicle chassis. The coupling part has a lock latch engageable with the locking bar and the latching is automatically releasable, against the action of the spring force corresponding to a definite minimum pull load of, for example, 75–80 kgs. Automatic disengagement is effected, on one hand, by an electromagnet responsive, with time delay, to an electronic time switch which is switched on responsive to occurrence of a definite minimum pull load, and, on the other hand, by a locking part which is displaceable by the locking bar. The time switch can be triggered recurrently responsive to the minimum pull load, and comprises a recurrently triggerable monostable circuit whose period of quasi-stable state corresponds to the desired time delay and whose stable output is logically combined, through a gate circuit, with the trigger input and connected, through a pulse amplifier, to an electro magnet.

11 Claims, 11 Drawing Figures

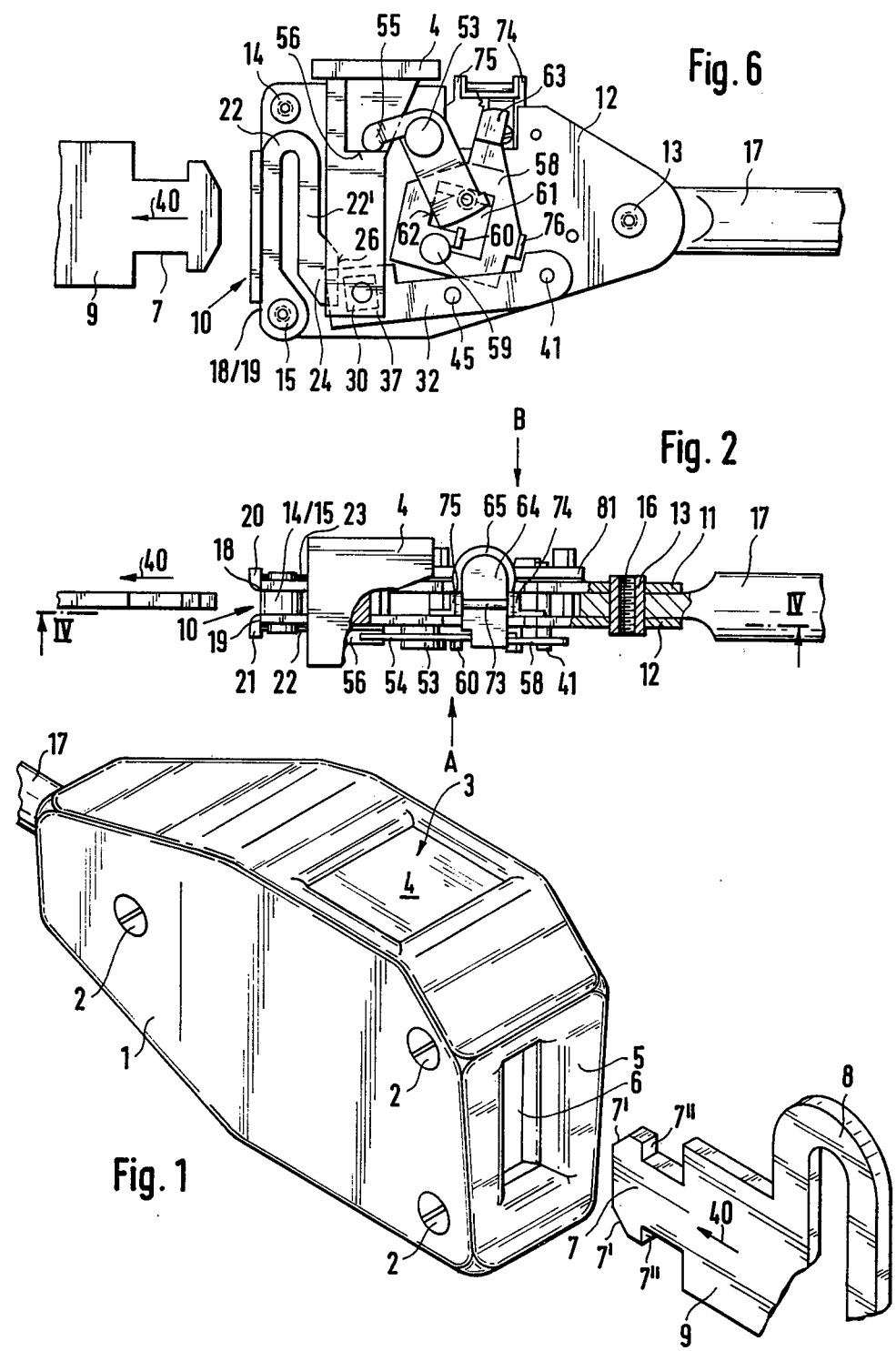

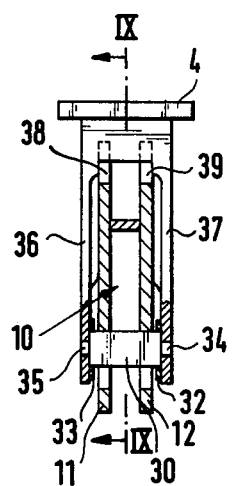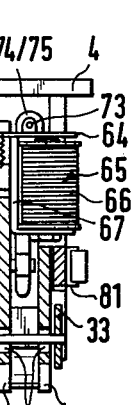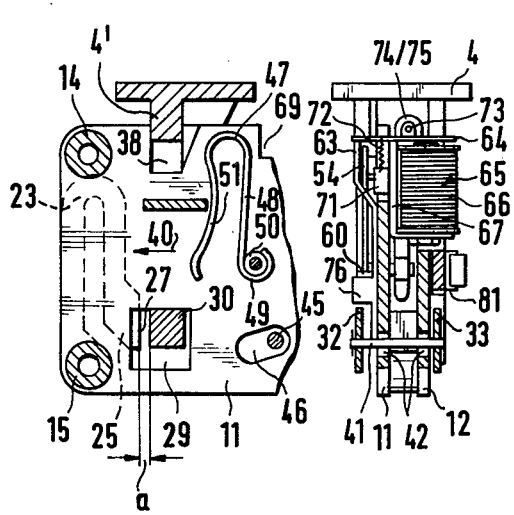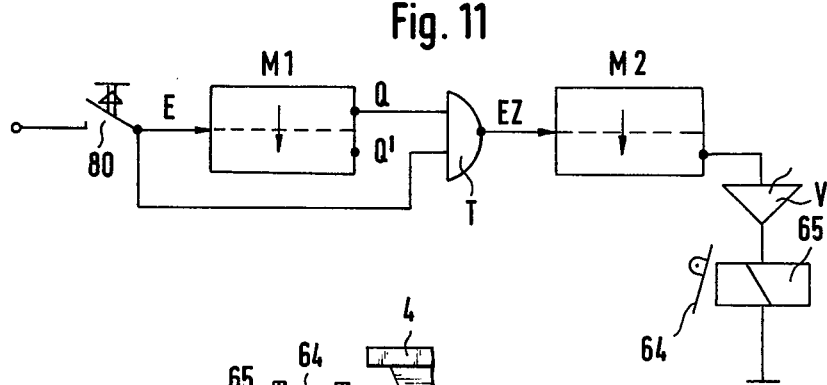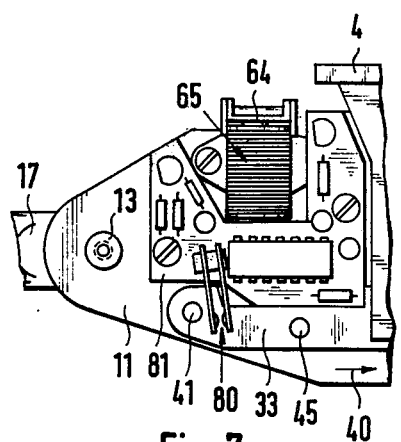

LOCK COUPLING FOR SAFETY BELTS IN MOTOR VEHICLES

FIELD OF THE INVENTION

The invention relates to a lock coupling for safety belts in motor vehicles, comprising a coupling pocket which is accomodated within a housing and secured, by one of its ends, to a holder fixed to the vehicle and provided, on its other end, with a plug slot, and in which a locking bar is provided which is held in its locking position by a spring force and is movable transversely to the plugging direction and actuable by means of a pushbutton, for detachably locking a bar- or latch-shaped coupling part which is secured to the safety belt and provided with a locking shoulder extending transversely of the plugging direction and is engageable into the plug slot, and in which an ejector spring is provided and acts on the plugged coupling part.

BACKGROUND OF THE INVENTION

Such lock couplings for so-called safety belts in passenger cars have been known for a long time and provided in substantially all licensed passenger vehicles. These known lock couplings, however, can be unlocked only by manual actuation of the pushbutton. This leads to situations that, in the event of an accident, vehicle occupants who are injured or became incapable of action due to a shock cannot free themselves from the safety belts, and that frequently safety belts must be cut through by the rescue team because the lock coupling is no longer accessible or, due to the pull load exerted by the injured person caught in the safety belt, can no longer or not rapidly enough be actuated. Aside from the fact that cutting safety belts results in an irreparable damaging of the same, experience teaches that a cutting tool, for example, a knife or scissors, is not immediately available at any scene of accident. Frequently, however, it is of primary importance for the survival of a victim of the accident not to be hindered, by the safety belts, from escaping from the vehicle, be it he or she is still able to leave the vehicle by his or her own efforts or with the assistance of other persons.

SUMMARY OF THE INVENTION

The invention starts from the assumption that a health or even life endangering accident is caused by a collision of the respective motor vehicle with some other object and that, due to the collision, a pull load, approximately corresponding to the body weight of the driver or passenger, is exerted on the lock couplings of the involved safety belts, that this pull load may be exerted for a short or longer time and repeatedly, for example, if a passenger car overturns several times or collides with several impacts, and/or that after one or more load surges, a permanent pull load acts on the coupling lock of the safety belt which may occur, for example, if a vehicle ends up by landing on its side or top and the driver or passenger involved in the accident so-to-speak ends up by hanging in the safety belts by his weight entirely or partly.

The invention is based on the problem of providing a lock coupling for safety belts in motor vehicles, of the above mentioned kind, making it possible, under the circumstances or consequences of an accident of the indicated nature, to free the occupants of the vehicle from the inside of the car by an automatic disengagement of the lock coupling, while ensuring at the same time that the automatic disengagement takes place only after the vehicle in collision has come to a standstill and only if the occupant or occupants of the vehicle do not hang in the safety belts due to their own immobility or to the overturned side or top position of the car. Also, it must be ensured in any event that the lock coupling does not disengage upon a slight collision nor during a sequence of a plurality of heavy collisions.

To solve this problem, the design, in accordance with the invention, of a lock coupling of the above mentioned kind is such that the locking bar in the coupling pocket is mounted for movement in the pull load direction against the action of a spring force which corresponds to a definite minimum pull load (for example, of 75 to 80 kgs), and is provided with a mechanism for automatic disengagement which is actuable by a spring force and comprises a locking member which is arrestable in its locking position preventing the automatic disengagement or releasable for automatic disengagement by means of, on the one hand, an electromagnet responsive with delay to an electronic time switch capable of being switched on upon the occurrrence of a definite minimum pull load, and, on the other hand, a locking part moved by the locking bar.

A lock coupling with such characterizing features provides the highest security to its user, since it performs its function, as a so-called safety belt in the motor vehicle, as a catching element for persons who are exposed to centrifugal forces caused by the accident only as long as such centrifugal forces can occur at all and thereupon, depending on the given circumstances, discontinues to perform this retaining function by an automatic disengagement at the instant of the intended rescue or act of freeing which became necessary.

While it would also be possible, in principle, to use a mechanical time switch for a delayed disengagement of the lock coupling, the use of an electronic time switch has the advantage that such a switch is not subject to any wear, any mechanical stresses, or any friction, nor to manufacturing tolerances, that it can be accomodated in a substantially smaller space, and that it ensures a substantially greater time accuracy than is attainable at all with mechanical delay arrangements or time switches. Another important advantage is that the component parts needed for embodying the invention can be easily spatially arranged within or on the coupling pocket in a manner such that it is not necessary to provide the housing surrounding the coupling pocket in an over-all size which would be substantially larger than that of conventional lock couplings. At the same time, it is also easily possible to dispose the pushbutton for manual disengagement of the lock coupling in the manner usual with conventional lock couplings, so that as far as the outside dimensions and the manner of operation are concerned, the inventive lock coupling need not differ from conventional lock couplings at all.

A functionally very important feature is that the time switch can be triggered recurrently, which means that the once started delay time of the time switch can be started again if, prior to the expiration, the triggering criterion, in the present case the minimum pull load, occurs again. That is, this makes it possible to provide a relatively short delay period and in spite of that, to cover the recurring pull load peaks in multiple collisions, which, according to experience, occur in very short consecutive periods of time, even in instances where, for example, during a multiple overturn of a motor vehicle, at the occurrence of the last pull load peak, the period of time elapsed since the occurrence of the first pull load peak is a multiple of the delay time proper.

Therefore, a further development of the invention provides that the electronic time switch as a timer comprises a recurrently triggerable monostable circuit whose period of quasi-stable state corresponds to the desired time delay and whose stable output is logically combined, through a gate, with the trigger input and connected to a pulse amplifier supplying the electromagnet.

Aside from the already mentioned important capability of the time switch of being recurrently triggered, this connection, i.e., the logic combination of the stable output with the input of the monostable circuit, ensures that the lock coupling is disconnected or automatically disengaged only if the respective person, immediately after an accident with one or more collisions, does not return into his or her normal sitting position and the minimum pull load is still effective at the lock coupling at the end of the last expired delay time. In cooperation with the already mentioned locking part, however, the locking member for disconnecting the lock coupling is released only if, after the response of the electromagnet, the minimum pull load is no longer applied, with a short-time absence of the pull load being sufficient for effecting a disengagement of the coupling part from the coupling pocket.

In this way, it is reliably made sure with simple means that the lock coupling does not disengage automatically until, for example, an injured person's full or partial body weight exerts a pull on the safety belts corresponding to the minimum pull load, but that, on the other hand, the lock coupling can easily and automatically be disconnected and disengaged by a short-time discontinuation of this initially continuous pull load. This may occur, for instance, if a vehicle involved in an accident lands on its side or top and the respective occupant of the vehicle hangs in the safety belts laterally or head down and is to be freed from this position by third persons.

For an understanding of the principles of the invention, reference is made to the following description of a typical embodiment thereof as illustrated in the accompanying drawings.

BRIEF DESCRIPTION OF THE DRAWINGS

In the Drawings:

FIG. 1 shows a lock coupling for safety belts in motor vehicles, complete with a housing and a coupling part;

FIG. 2 is a top view of the lock coupling without housing;

FIG. 6 is the same view as in FIGS. 3 and 5, with a further functional position of the individual parts;

FIG. 7 is a side elevational view in the direction B, of FIG. 2;

FIG. 8 is a sectional view taken along the line VIII—VIII of FIG. 3;

FIG. 9 is a sectional view taken along the line IX—IX of FIG. 8;

FIG. 10 is a sectional view taken along the line X—X of FIG. 3; and

FIG. 11 is a block diagram of the electronic timing and release circuit.

DESCRIPTION OF THE PREFERRED EMBODIMENT

Figure 3:
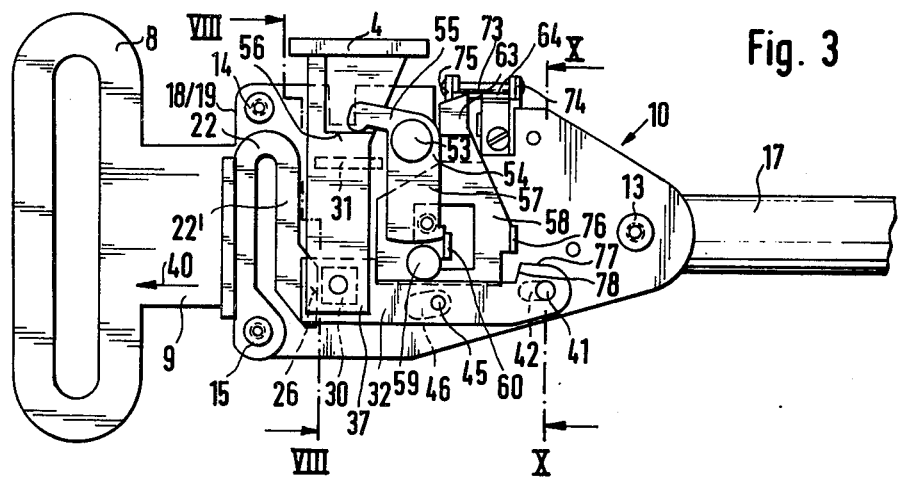
FIG. 3 is a side elevational view in the direction A, of FIG. 2.

The outer shape of housing 1 of the lock coupling as shown in FIG. 1 is derived from lock coupling shapes known per se and, in itself, not essential for the invention. The objective in this respective is only generally to serve the purpose and to ensure a tasteful shape. The housing comprises two shell parts which are connected to each other by screws 2. The top of the housing is provided with a square aperture 3 through which a release button 4 is accessible. The narrow front face 5 of the housing is formed with a slot-shaped plug aperture 6 into which a coupling part 9, comprising a T-shaped lock latch 7 and a belt eye 8, can be introduced. This coupling part 9 is shiftably attached to a safety belt (not shown), in the usual manner by passing the belt through belt eye 8 and securing the two ends of the belt to the vehicle in a suitable way.

Housing 1 accomodates a coupling pocket 10 shown in FIGS. 2 to 10, comprising substantially two metal plates 11 and 12 which extend parallel to each other while spaced apart by about 4 mm and are connected to each other by three clinch bolts 13, 14, 15. Each of clinch bolts 13, 14, 15 is provided with an axial taphole 16 into which screws 2 of housing 1 are screwed from both sides. From clinch bolt 13, which is provided at the rear end of coupling pocket 10, a tie strip 17 is suspended, which is connected to a tension member, for example, a wire rope length or a metal strip, which, in turn, is secured to the vehicle chassis. The vertical front edges 18 and 19 of plates 11 and 12 are formed with short back-up strips 20 and 21 which are bent outwardly at a right angle and against which there are applied U-shaped leg springs 22 and 23 which are disposed outside of the respective plates 11 and 12 and secured to clinch bolt 15. These leg springs 22 and 23 are made of flat material and have lozenge-shaped enlarged portions 24, 25 at the ends of their free legs 22', 23'. The vertical edges 26, 27 of these enlarged portions project into the clearance area of rectangular openings 28, 29 which are provided in each of plates 11, 12 and aligned with each other. In these openings 28, 29, a locking bar 30 is disposed having a square cross section. The two openings 28 and 29 may be distinguished best in FIGS. 4 and 9. There it is also shown that the cross-sectional sides of locking bar 30 have about half the length of the boundary edges of openings 28, 29, so that locking bar 30 is movable within the openings both in the vertical and the horizontal directions through a distance corresponding to its cross-sectional side, which is about 6 mm. At a certain distance above locking bar 30, a horizontally extending guide and support plate 31 is provided the purpose of which will be explained hereinafter.

Locking bar 30 extends through the two openings 28, 29 of plates 11 and 12 and its length is dimensioned so that, at both sides of plates 11 and 12, the square cross section of the bar projects beyond the plates to an extent such that two guide levers 32 and 33, provided at the outsides of plates 11, 12, can be applied against these portions of square cross section of the bar, to prevent an angular motion of the vertical locking surface. For this purpose, each of the two guide levers 32, 33 is provided with an opening conformable to the cross section of locking bar 30. Further, by means of centric studs 34, 35, locking bar 30 is supported in the vertical legs 36, 37 of release button 4, which legs extend at the outsides of plates 11, 12. Above, release button 4 is guided, by means of a cross web 4', in two guide slots 38 and 39 of plates 11, 12 with such a play as not to impede a horizontal movement of locking bar 30 within openings 28, 29 in the pull load direction which is indicated by arrow 40.

Figure 4:
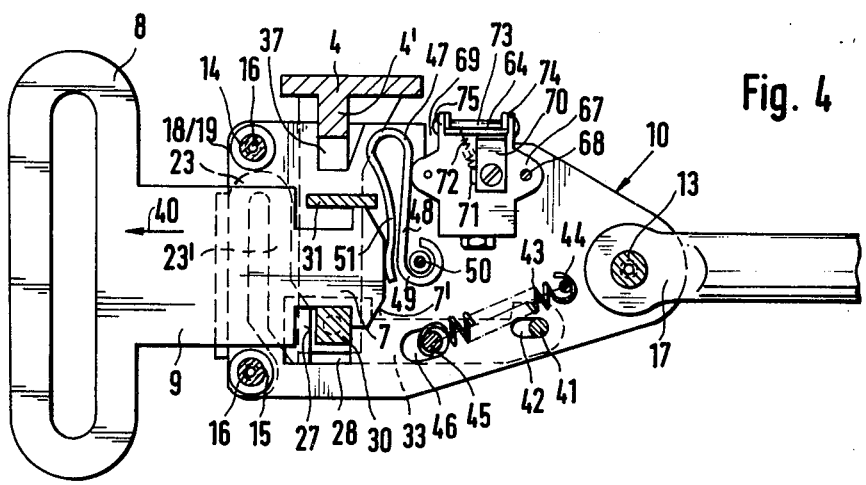
FIG. 4 is a sectional view taken along the line IV—IV of FIG. 2.

The two guide levers 32 and 33 are mounted, by means of a common pivot pin 41, for pivoting and horizontal displacement in horizontally extending oblong slots 42 of the two plates 11 and 12, and are subjected to the action of a tension spring 43 which is suspended with bias, on the one hand, from a pin 44 which is fixed to the plates above oblong slots 42 and, on the other hand, from a connecting pin 45 which is secured approximately in the middle of the length of the two guide levers 32 and 33. Connecting pin 45 extends through two slot-shaped oblong openings 46 which are provided in plates 11 and 12 and which give to pin 45 and to the two guide levers 32 and 33 and, thereby, to locking bar 30, the necessary freedom of motion. As best seen in FIG. 4, locking bar 30 and guide plate 31 are in such relative position to each other that the coupling part can be introduced into coupling pocket 10, from the front side and against the direction of arrow 40, in a manner such that during the introduction, one of the oblique front faces 7', i.e., the lower one, displaces locking bar 30 downwardly through the height of the vertical locking shoulder 7", while the upper portion of latch 7 is backed up by guide plate 31. As soon as coupling part 9 is introduced into coupling pocket 10 to a sufficient depth, locking bar 30 snaps behind lower locking shoulder 7" due to the action of tension spring 43, thereby effecting the locking of coupling part 9 in coupling pocket 10. This engagement can be unlocked only by a corresponding downward movement of locking bar 30. Such a downward movement of locking bar 30, however, can be effected only by a corresponding actuation of release button 4. FIGS. 4 and 9 further show that a hairpin-shaped leaf-type spring 47 is provided in the coupling pocket, having one of its legs 48 secured to a pin 50 by means of a circular eye 49 bent thereon, with the other leg 51 extending in the zone of introduction of the front edge of latch 7 of coupling part 9. In FIG. 9, spring 47 is shown in its released position, while in FIG. 4 it is shown in tensioned position with the coupling part locked. Spring 47 acts at the same time as an ejector spring and a spring for automatic release which is capable of actuating release button 4. For this purpose, a two-armed crank lever 54 is pivotally mounted on the outside of plate 12, by means of a journal pin 53. Crank lever 54 comprises an approximately horizontally extending short lever arm 55 resting on a horizontal shoulder 56 of leg 37 of release button 4, and a vertical lever arm 57 which is longer than lever arm 55 and to which the pin 50 is secured, which extends through the circular eye 49 of spring 47. Since pin 50 must extend through plate 12, this plate is provided, in the pivotal zone of pin 50, with a recess (not shown). In order to enable spring 47 to effect the release movement of locking bar 30, a correspondingly strong dimensioning of the spring is provided, while taking into account that during the release movement, the spring has to surmount not only the vertical force component of the obliquely extending tension spring 43, but also some friction between locking shoulder 7" of latch 7 of coupling part 9 and locking bar 30.

To prevent crank lever 54, during the introduction of coupling part 9 into coupling pocket 10, from simultaneously effecting a release movement of release button 4, it is necessary to arrest crank lever 54 in its position shown in FIG. 3. To this end arresting means are used whenever, a locking lever 58 is provided which is pivoted to plate 12 by means of a pivot pin 59 provided in the plate at a location in alignment with the vertical lever arm 57 of crank lever 54, and which carries a locking tongue 60 which is provided close to pivot pin 59 or close to the pivotal axis thereof and projects into the pivotal plane of lever arm 57 of crank lever 54. Locking lever 58 is positioned intermediate crank lever 54 and plate 12. It is provided with a rectangular recess 61 whose frontal vertical boundary edge 62 is disposed so that locking lever 58 is moved, by the pin 50 carried on lever arm 57, into the locking positon shown in FIG. 3, as soon as release button 4 is brought, after a release operation and by tension spring 43 acting on guide levers 32 and 33, into its locking position which, at the same time, is its rest position. During this operation, crank lever 54 executes a pivotal motion in the clockwise direction, as viewed in FIGS. 3, 5, and 6, which results in its final phase in a counterclockwise pivotal motion of locking lever 58, since pin 50 comes into contact with edge 62 of recess 61.

Locking lever 58 can be blocked in its locking position by means of two locking mechanisms which are independent of each other. One or the first of these mechanisms or means comprises a tongue 63, which is angled into the plane of crank lever 54 and spaced from pivot pin 59 by a distance which is about six times greater than that of locking tongue 60, and in whose outer path of motion a two-armed hinged armature 64 of an electromagnet 65 is provided. The coil yoke 67, having the shape of an angle plate and carrying the coil 66 and the coil core, is screwed to the inside of plate 11 by means of screws 68. At the respective location, plate 11 is provided with a corresponding recess 69. At the side of vertical yoke plate 67 which is remote from the solenoid, a supporting angle 70 with a spring eye 71 is secured, from which a tension spring 72 is suspended the other end of which is secured to hinged armature 64. Armature 64 is hinged by means of a hinge pin 73 and hinge sleeves 74, 75 and supported by angle 70 in a manner such that, in the deenergized state of electromagnet 65, the armature projects into the path of motion of tongue 63 of locking lever 58 while this lever is in its locking position, and that, with the coil 66 energized, locking lever 58 and its tongue 63 are cleared by hinged armature 64.

The other or second locking mechanism or means is formed by a stop lug 76 of locking lever 58, bent at a right angle, and a stop edge 77 of guide lever 32 which is provided at the outside of plate 12, which can be brought, by a horizontal displacement of guide lever 32 in the direction of arrow 40, i.e., in the pull load direction, into the path of motion of stop lug 76. By means of an approximately vertical step 78, stop edge 77 is limited in a manner such that, in the position shown in FIGS. 3, 4, and 6 in which pivot pin 41 is in a position at the rear end, i.e., the end nearer to the tie strip 17, of oblong slots 42, locking lever 58 is not hindered by its stop lug 76 from executing a clockwise pivotal motion and thereby perhaps clear crank lever 54 by a release movement of release button 4.

It may be learned, for example, from FIG. 9 that locking bar 30 is slightly spaced, by a small distance g of about 1 to 2 mm, from vertical edges 26, 27 of leg springs 22, 23, so that locking bar 30 with the two guide levers 32, 33 is movable in the horizontal direction through a distance corresponding to the spacing g, i.e., in the direction of the pull load (arrow 40), in which only the horizontal force component of the obliquely extending tension spring 43 is effective and is to be overcome. This makes it possible to prevent an unlocking by a relatively small pull on the engaged coupling part 9, since in the position displaced by the distance g in the arrow direction 40, guide levers 32 and 33 and locking lever 58, which perhaps has already been released by the electromagnet, remain locked because stop lug 76 bears against stop edge 77 of guide lever 32.

Figure 5:
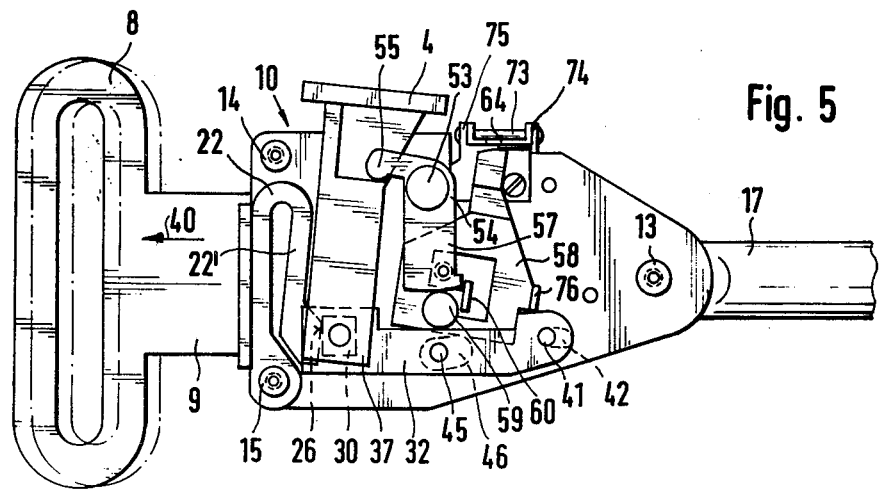
FIG. 5 is the same view as in FIG. 3, with a different functional position of the individual parts.

On the other hand, however, it is also possible to provide such a small gap g between locking bar 30 and contact edges 27 of leg springs 22, 23, or to provide the step 78 limiting the stop edge 77 of guide lever 32 at such a location, that the mentioned locking of locking lever 58 by stop lug 76 takes place only with the pull load of such magnitude that the free legs 22', 23' of leg springs 22, 23 are deflected, as shown, for example, in FIG. 5.

Leg springs 22 and 23 are dimensioned so that, with a maximum displacement of locking bar 30 and guide levers 32, 33 connected thereto, through a distance corresponding to the length of oblong slots 42 or to the horizontal freedom of motion of locking bar 30 in openings 28, 29 of plates 11, 12, they produce a counterforce of approximately 70 to 80 kgs, which would correspond to the average body weight of an adult man.

As shown in FIG. 7, an electrical contact switch 80 is provided on the outside of plate 12, in the range of motion of pivot pin 41, serving as a pulse generator for switching on an electronic circuit controlling electromagnet 65, and comprising a time switch. This electronic circuit is shown in FIG. 11 as a block diagram. The circuit substantially comprises two monostable circuits M1 and M2, referred to in the following as monoflops, a gate circuit T, and an amplifier V. Monoflop M1 can be triggered recurrently, which means that upon each arrival of a trigger pulse due to the closing of switch 80, the fixedly set period of its quasi-stable state starts running again. While in the stable switching state, the output Q of monoflop M1 is voltage-carrying, in the quasi-stable or unstable state, output Q' carries the voltage. The input of gate circuit T is connected, on the one hand, to the trigger input E of monoflop M1 and, on the other hand, to the stable output Q of monoflop M1. The output of gate circuit T is connected to the trigger input EZ of monoflop M2 which cannot be triggered recurrently and which only furnishes the sufficiently long and sufficiently powerful energizing pulse for electromagnet 65. In the present instance, the period of relaxation of monoflop M1, i.e., the duration of its triggered quasi-stable state, is 10 seconds. This means that, upon an only short-time closing of switch 80, the trigger pulse thereby produced flips monoflop M1 for a period of 10 seconds from its stable state into its quasi-stable or unstable state, whereupon, after expiration of these 10 seconds, the monoflop returns into its stable state. Since, however, in the present instance, switch 80 will be or is closed only if and as long as the minimum pull load, for example, of 70 kgs, acts on coupling part 9, the electromagnet 65 can be energized and, consequently, tongue 63 of locking lever 58 can be cleared by hinged armature 64 of electromagnet 65 only if this minimum pull load of 70 kgs is effective for at least 10 seconds. If this is the case and if the minimum pull load remains further effective, first, locking lever 58 is released from hinged armature 64, i.e., the attracted hinged armature 64 clears locking lever 58 initially for a small pivotal motion in the clockwise direction until stop lug 76 abuts stop edge 77 of guide lever 32 which is displaced in the direction of arrow 40, as shown in FIG. 5. Due to this small pivotal motion, tongue 63 of locking lever 58 comes into a position below hinged armature 64 so that after the energizing pulse of electromagnet 65 is ended, the armature initially cannot lock tongue 63 again. Thus locking lever 58 is still in its locking position. Crank lever 54 which is under the action of tensioned spring 47, still applies to locking tongue 60 and is prevented from effecting the automatic release by correspondingly moving down release button 4 and locking bar 30. Only after a cessation of the pull load enables guide lever 32 to return to its initial position shown in FIGS. 3 and 6, crank lever 54 has its way cleared for effecting the release motion. The release motion of the locking lever takes place due to the torque produced by crank lever 54 acting on locking tongue 60.

As shown in FIG. 7, the electrical and electronic component parts or circuit elements of the timer circuit diagrammatically illustrated in FIG. 11 are arranged on a circuit board 81 which is supported on and insulated from plate 11 on the outside thereof. In FIGS. 2 to 10, the component parts of the embodiment are shown in actual size. This makes it clear that the entire device occupies a very small space.

I claim:

1. In a lock coupling for safety belts, in motor vehicles, including a coupling pocket accommodated within a housing and secured, by one of its ends, to a holder fixed to the vehicle, and provided on its opposite end, with a plug slot, a locking bar in the pocket, spring biased to its locking position, movable transversely to the plugging direction and actuable by means of a button, for detachably locking a bar-shaped or latch-shaped coupling part secured to the safety belt and provided with a locking shoulder extending transversely of the plugging direction and engageable into the plug slot, and with said locking bar and an ejector spring acting on the plugged coupling part; the improvement comprising, in combination, said locking bar being mounted in said coupling pocket for movement in a pull-load direction against the bias of a spring force corresponding to a definite minimum pull load, said locking bar being moved in the pull-load direction by said plugged coupling part when said plugged coupling part is pulled by at least the definite minimum pull load; a minimum pull load spring in said coupling pocket engageable with said locking bar to provide the bias of said spring force; a spring-biased mechanism operable to effect automatic disengagement of said coupling part from said locking bar; said mechanism including a crank member operatively associated with said ejector spring and locking bar to release said coupling part, a locking member operatively associated with said crank member and locking bar and having a locking position preventing such automatic disengagement and being releasable for such automatic disengagement; first means operatively associated with said locking member to release the same for such automatic disengagement, said first means comprising an electromagnet and an electronic time switch switched on upon the occurrence of a definite minimum pull load, said electromagnet being operable responsive to such switching on of said electronic time switch; and second means operatively associated with said locking member for releasing the same for such automatic disengagement, said second means comprising a locking part operatively associated with said locking bar and displaceble by movement of said locking bar by said button.

2. A lock coupling according to claim 1, in which said time switch can be triggered recurrently.

3. A lock coupling according to claim 2, in which said electronic time switch operates as a timer and comprises a recurrently triggerable monostable circuit having a trigger input and a stable output; a pulse amplifier having an output supplying said electromagnet; and a gate having inputs connected, respectively, with said stable output and said trigger input, and having an output connected to the input of said pulse amplifier; said gate effecting a logical combination of said stable output with said trigger input and said pulse amplifier.

4. A lock coupling according to claim 3, including a second monostable circuit having a trigger input connected to the output of said gate and having a quasi-stable output connected, through said amplifier, to said electromagnet.

5. A lock coupling, according to claim 1, in which said crank member comprises a spring-biased release lever having a first lever arm and a second lever arm; said button having a shoulder and said first lever arm bearing against said shoulder; said locking member having a stop and said second lever arm being cooperable with said stop; and means mounting said stop for pivoting into the path of movement of said second lever arm.

6. A lock coupling, according to claim 5, in which said ejector spring is designed as a hair pin-shaped leaf spring tensioned responsive to introduction of said coupling part into said coupling part; and means connecting said release lever to said ejector spring.

7. A lock coupling, according to claim 6, in which said locking member comprises a locking lever pivoted on a pivot bearing; said electromagnet comprising an armature; the end of said locking lever spaced from said pivot bearing being capable of being interlocked with said armature; said locking lever further including, at a position close to said pivot bearing, a first stop for said release lever and, at a greater distance from said pivot bearing, a second stop; and a locking slider connected to said locking bar; said second stop being in the path of motion of said locking slider; said locking slider being brought into a locking position by a pull load.

8. A lock coupling according to claim 7, in which said release lever is operable to move said pivoting lever to its rest position or to its locking position.

9. A lock coupling according to claim 8, including means mounting said locking slider, at its end remote from said locking bar, for both pivoting and moving in the pull-load direction; and a return spring operable to retain said locking slider in its rest position in which said locking bar is also in its non-loaded position.

10. A lock coupling according to claim 9, including at least one U-shaped leg spring at each side of said plug slot of said coupling pocket; each leg spring being formed of a strip of flat material to have legs extending with their flat sides in parallel planes of movement and transversely to the pull load direction.

11. A lock coupling according to claim 10, in which the relative location of said U-shaped leg springs and said locking bar is such that a clearance of 0.5 to 1.5 mm is provided between said leg springs and said locking bar, in the pull load direction.

* * * * *